(12) United States Patent
Burt et al.

(10) Patent No.: US 7,781,701 B2
(45) Date of Patent: Aug. 24, 2010

(54) ELECTRODE TIP

(75) Inventors: Randall M. Burt, Mentor, OH (US); Jonathan Sterling Ogborn, Concord Township, OH (US)

(73) Assignee: Lincoln Global, Inc., Monterey Park, CA (US)

( * ) Notice: Subject to any disclaimer, the term of this patent is extended or adjusted under 35 U.S.C. 154(b) by 286 days.

(21) Appl. No.: 11/150,893

(22) Filed: Jun. 13, 2005

(65) Prior Publication Data

US 2006/0278627 A1 Dec. 14, 2006

(51) Int. Cl.
*B23K 35/02* (2006.01)

(52) U.S. Cl. .............................. 219/145.1; 219/145.23; 219/146.52

(58) Field of Classification Search .............. 219/145.1, 219/145.23, 146.52, 145.41, 146.1, 146.23, 219/146.32, 146.51
See application file for complete search history.

(56) References Cited

U.S. PATENT DOCUMENTS

| | | | | |
|---|---|---|---|---|
| 2,394,550 A | * | 2/1946 | Jensen | 219/145.41 |
| 2,824,817 A | * | 2/1958 | Shutt | 219/146.52 |
| 3,201,563 A | * | 8/1965 | Lehnert | 219/145.21 |
| 3,511,967 A | * | 5/1970 | Helm | 219/145.1 |
| 3,620,830 A | * | 11/1971 | Kramer | 219/145.23 |
| 3,627,574 A | * | 12/1971 | Delong et al. | 428/562 |
| 3,846,613 A | * | 11/1974 | Jurchenko et al. | 219/145.23 |
| 4,355,054 A | * | 10/1982 | Nagano et al. | 427/61 |
| 4,426,428 A | * | 1/1984 | Kammer et al. | 428/561 |
| 6,153,847 A | * | 11/2000 | Nakatani et al. | 219/72 |
| 6,939,413 B2 | * | 9/2005 | Crockett | 148/23 |
| 2005/0121110 A1 | * | 6/2005 | Dallam et al. | 148/23 |
| 2005/0127132 A1 | * | 6/2005 | Crockett | 228/56.3 |
| 2005/0247688 A1 | | 11/2005 | Burt et al. | |

FOREIGN PATENT DOCUMENTS

| | | |
|---|---|---|
| CN | 2180394 Y | 10/1994 |
| CN | 1532023 A | 9/2004 |
| EP | 1125673 | 8/2001 |
| GB | 841544 | 7/1960 |
| JP | 58107296 | 6/1983 |
| JP | 59156600 | 9/1984 |
| RO | 116059 | 10/2000 |

OTHER PUBLICATIONS

ISBN 7-111-00776-X/TG 183.
EP Search Report Dated Aug. 29, 2008.

* cited by examiner

*Primary Examiner*—M. Alexandra Elve
(74) *Attorney, Agent, or Firm*—Hahn Loeser & Parks LLP; Louis F. Wagner

(57) ABSTRACT

A welding electrode comprising a metal core and a coating material that includes flux compounds is at least partially coated on an outer surface of said metal core. The tip of the welding electrode is beveled and a portion of the beveled tip has an end coating material which includes an electrically-conductive material.

40 Claims, 1 Drawing Sheet

ELECTRODE TIP

BACKGROUND OF THE INVENTION

In the field of arc welding, the main types of welding processes are gas-metal arc welding with solid (GMAW) or metal-cored wires (GMAW-C), gas shielded flux-cored arc welding (FCAW-G), self shielded flux-cored arc welding (FCAW-S), shielded metal arc welding (SMAW) and submerged arc welding (SAW). Of these processes, gas metal arc welding with solid or metal-cored electrodes are increasingly being used for joining or overlaying metallic components. These types of welding processes are becoming increasingly popular because such processes provide increased productivity and versatility. Such increase in productivity and versatility results from the continuous nature of the welding electrodes in gas metal arc welding (GMAW & GMAW-C) which offers substantial productivity gains over shielded metal arc welding (SMAW). Moreover, these electrodes produce very good looking welds with very little slag, thus saving time and expense associated with cleaning welds and disposing of slag, a problem that is often encountered in the other welding processes. In submerged arc welding, coalescence is produced by heating with an electric arc between a bare-metal electrode and the metal being worked. The welding is blanketed with a granular or fusible material or flux. The welding operation is started by striking an arc beneath the flux to produce heat to melt the surrounding flux so that it forms a subsurface conductive pool which is kept fluid by the continuous flow of current. The end of the electrode and the work piece directly below it become molten, and molten filler metal is deposited from the electrode onto the work. The molten filler metal displaces the flux pool and forms the weld. In shielded metal arc welding, shielding is obtained by a flux coating instead of a loose granular blanket of flux. In flux-cored electrodes, the flux is contained within the metal sheath.

In the art of welding, much prior effort has been expended in developing flux compositions of the type having predetermined flux components intended to perform in predetermined manners. A large number of compositions have been developed for use as fluxes in arc welding both for use generally as welding fluxes and for use as a coating on a metallic core or within a sheath. Fluxes are utilized in arc welding to control the arc stability, modify the weld metal composition, and provide protection from atmospheric contamination. Arc stability is commonly controlled by modifying the composition of the flux. It is therefore desirable to have substances which function well as plasma charge carriers in the flux mixture. Fluxes also modify the weld metal composition by rendering impurities in the metal more easily fusible and providing substances which these impurities may combine with in preference to the metal to form slag. Other materials may be added to lower the slag melting point, to improve slag fluidity, and to serve as binders for the flux particles.

One problem encountered with welding with stick electrodes is the resultant porosity of the weld metal, especially at the beginning of the welding process. At the start of the weld process using a stick electrode, the heat transferred to the tip of the electrode is initially relatively low and then increases rapidly. As a result, at the start of the welding process, some of the stick electrode melts and is transferred to the workpiece to begin the formation of a weld bead. Although the initial heating of the tip of the electrode is sufficient to melt the internal wire rod of the stick electrode, the initial heat is insufficient to heat the coating sufficiently on the electrode, which coating provides a shielding gas during the welding operation. The shielding gas generated by the coating produces an environment about the weld metal that inhibits or prevents oxygen and nitrogen from dissolving in the weld metal, which dissolved gases may subsequently be expelled from the weld metal during the cooling of the weld bead. The expulsion of these gasses from the weld metal can result in porosity in the weld metal which in turn can result in an inferior weld bead. As a result, at the beginning of the welding process, the metal transferred to the workpiece can have an unacceptable amount of porosity which can result in a reduction in the weld bead quality. U.S. Ser. No. 10/840,701 filed May 6, 2004, which is incorporated herein by reference, discloses one type of stick electrode to address the porosity problems associated with stick electrodes.

Another problem encountered with welding with stick electrodes is weld puddle control at the beginning of the welding process. This is especially a concern when welding in the vertical down position. Typically, the welding wire does not easily melt at the beginning of the welding process, thus the quality of the weld bead is less acceptable at the start of a welding process.

In view of the problems of weld bead porosity and weld puddle control at the start of welding when using prior art stick electrodes, there remains a need for a stick electrode that forms a high quality weld bead throughout the welding process.

SUMMARY OF THE INVENTION

The present invention pertains to welding electrodes, and more particularly, to a welding electrode that at least partially provides protection to the weld metal during a welding process. The welding electrode of the present invention is particularly directed to a stick electrode; however, the invention can be applied to other types of electrodes. The welding electrode includes a coating composition that is formulated to at least partially protect the weld metal from oxygen and nitrogen during a welding process. The welding electrode also includes an end coating material located at the end region of the welding electrode. The coating composition typically is used on self-shielding stick electrodes formed of a metal rod coated with the coating composition; however, the electrode coating can be used on and/or in other types of electrodes (e.g., flux cored electrodes, etc.). The coating composition includes a flux composition. The flux composition of the coating composition and the end coating material include one or more distinct components from one another. The end coating material is formulated in part to inhibit or prevent porosity problems that can occur in the formed weld bead during the beginning of the welding operation. The flux composition is in part formulated to generate a shielding gas to at least partially shield the weld metal from the atmosphere.

In another and/or alternative aspect of the present invention, the composition of the metal rod is selected to at least closely match the desired weld metal composition. Typically the metal rod includes a majority of iron when welding a ferrous based workpiece (e.g., carbon steel, stainless steel, etc.); however, the composition of the weld rod can include various types of metals to achieved a particular weld bead composition. The metal rod is typically a solid metal rod; however, the metal rod can be a cored metal rod. If the metal rod includes a core, the core can be vacant, include one or more alloying agents, include one or more flux agents, or include one or more flux and/or alloying agents (e.g., coating composition).

In still another and/or alternative aspect of the present invention, the coating composition includes a binder, one or more conductive materials, and one or more weld metal protection compounds. The components of the coating composition can include metal oxides (e.g., aluminum oxide, boron oxide, calcium oxide, chromium oxide, iron oxide, magnesium oxide, niobium oxide, potassium oxide, silicon dioxide, sodium oxide, tin oxide, titanium oxide, vanadium oxide, zirconium oxide, etc.), metal carbonates (e.g., calcium carbonate, etc.), metal fluorides (e.g., barium fluoride, bismuth fluoride, calcium fluoride, potassium fluoride, sodium fluoride, Teflon, etc.), and/or metal alloying agents (e.g, aluminum, boron, calcium, carbon, chromium, iron, manganese, nickel, silicon, titanium, zirconium, etc.) that are combined with the binder. In one non-limiting embodiment of the invention, the binder is formulated to secure the coating composition to the outer surface of the wire rod. In another and/or alternative non-limiting embodiment of the invention, the binder includes silicates (e.g., sodium silicate, potassium silicate, etc.); however, other or additional binders can be used. Examples of silicate binders are disclosed in U.S. Pat. Nos. 4,103,067; 4,131,784; 4,208,563; 4,355,224; 4,741,974; 5,300,754 and 6,939,413, all of which are incorporated herein by reference. As can be appreciated, other types of binders can be used such as, but not limited to the binders disclosed in U.S. Pat. Nos. 4,103,067 and 4,662,952, which are incorporated herein by reference. Silicate binders are popular because of 1) their resistance to decomposition under conditions of use, 2) their binding strength, 3) their ability to be extruded at relatively high rates, 4) and their ability to form a hard film when dried, 5) their ease of handling, 6) their ability to be kneaded and mixed with other components, 7) their inexpensive material cost, etc. The use of silicates can also enhance the welding procedure such as, but not limited to, improving arc stability during welding, facilitating in forming a low melting point component, facilitating in adjusting the melting/freezing range of the slag. In yet another and/or alternative non-limiting embodiment of the invention, the coating composition is coated and/or extruded onto the outer surface of the wire rod. The materials that are included in the coating composition are generally added to a liquid binder and then kneaded to a consistency that is appropriate for subsequent extrusion. The mass of kneaded mixture is commonly formed into "slugs" which facilitates in handling during the time of storage and the loading of presses with the mixture for the extrusion operation. The plasticity of the coating composition on the wire rod is at least partially controlled by the composition of the binder. In still yet another and/or alternative non-limiting embodiment of the invention, coated wire is typically cut and then the coating composition on the cut wire is dried. Drying of the coating composition is generally carried out at a low temperature beginning at about 100-150° C. with controlled humidity in order to obtain uniform drying without cracking. This drying step is generally followed by one or more higher temperature drying steps at a lower humidity depending upon the nature of the coating composition. In a further and/or alternative non-limiting embodiment of the invention, the binder constitutes at least about one (1%) weight percent of the coating composition after being dried. In one aspect of this non-limiting embodiment, the binder constitutes about 1-80 weight percent of the coating composition after being dried. In a further and/or alternative non-limiting embodiment of the invention, the coating composition includes one or more conductive materials that conduct current to facilitate in the melting of the end of electrode. Generally the conductive material is supplied as small particles to facilitate in the dispersement of the conductive material in the binder. These conductive materials include, but are not limited to, graphite, titanium, iron and/or iron alloys (e.g., Fe—Al, Fe—Mn, Fe—Si, Fe—Ti, etc.), aluminum, etc.; however, it can be appreciated that other or additional conductive materials can be used. The average particle size of the conductive materials is generally about 40-300 mesh, and typically about 100-250 mesh; however, other sizes can be used. In one aspect of this non-limiting embodiment, the conductive material constitutes about 0.1-80 weight percent of the coating composition after being dried. In still a further and/or alternative non-limiting embodiment of the invention, at least one of the weld metal protection compounds includes a gas generating compound that generates a shielding gas during the welding operation. The gas generating compounds generally decompose during the welding operation and release a gas that at least partially protects the weld metal (e.g., $CO_2$ generating compounds, fluoride generating compounds, etc.). In one aspect of this non-limiting embodiment, the gas generating compound, when used, constitutes about 0.1-75 weight percent of the coating composition after being dried. In yet a further and/or alternative non-limiting embodiment of the invention, the coating composition includes one or more alloying agents used to facilitate in forming a weld metal with the desired composition. In one aspect of this non-limiting embodiment, the alloying agent, when used, constitutes about 0.1-75 weight percent of the coating composition after being dried. In still yet a further and/or alternative non-limiting embodiment of the invention, the coating composition includes one or more slag modifiers. In another and/or alternative non-limiting embodiment of the invention, the coating composition includes one or more electric arc modifiers. In still another and/or alternative non-limiting embodiment of the invention, the coating composition includes one or more fume production modifiers.

In still yet another and/or alternative aspect of the present invention, the end coating material 1) has a composition that is different from the coating composition, and 2) is positioned at the end region of the electrode. The end coating material can be at least partially coated 1) on the end of the metal rod, 2) on the outer side surface of the metal rod at the end region of the metal rod, and/or 3) on the surface of at least a portion of the coating composition at the end region of the metal rod. In one non-limiting embodiment of the invention, the end coating material is at least partially formulated to facilitate in forming and maintaining an electric arc between the end of the welding electrode and the workpiece, especially at the beginning of the welding procedure. In one non-limiting embodiment of the invention, the end coating material includes one or more electrically conductive materials. The electrically conductive material is used to at least partially conduct current in and/or through the end coating material to facilitate in the melting of the end of the electrode at the initiation of the arc between the welding electrode and the workpiece. The electrically conductive material can also be used to maintain the arc between the electrode and the workpiece once the arc has been formed. Generally the electrically conductive material is supplied as small particles to facilitate in the dispersement of the electrically conductive material in the end coating material. The average size of the electrically conductive material particles is generally no greater than about 100 mesh, and typically about 200-400 mesh; however, other sizes can be used. The electrically conductive material can include one or more materials such as, but not limited to, graphite, magnesium, titanium, iron and/or iron alloys (e.g., Fe—Al, Fe—Mn, Fe—Si, Fe—Ti, etc.), aluminum, etc. In one aspect of this non-limiting embodiment, the electrically conductive material generally constitutes about 0.5-70 weight percent of the end coating material prior to being dried, typically about 1-60 weight percent of the end coating material prior to being dried, more typically about 5-50 weight percent of the end coating material prior to being dried, still more typically about 6-40 weight percent of the end coating material prior to being dried, and yet still more typically about 10-30 weight percent of the end coating material prior to being dried; however, it can be appreciated that other weight percentages can be used. In another and/or alternative non-limiting embodiment of the invention, the end coating material includes one or more binders to secure and/or bind the components of the end coating material to the metal rod and/or to the coating composition on the metal rod. In one aspect of this non-limiting embodiment, the one or more binders in the end coating material constitutes about 0.5-70 weight percent of the end coating material prior to being dried, typically about 1-60 weight percent of the end coating material prior to being dried, more typically about 5-50 weight percent of the end coating material prior to being dried, still more typically about 10-55 weight percent of the end coating material prior to being dried, and still yet about 20-40 weight percent of the end coating material prior to being dried; however, other weight percentages can be used. The one or more binders can include a variety of compounds. The composition of the one or more binders can be the same as or different from the one or more binders used in the coating composition. In one non-limiting formulation of the binder, the one or more binders can include one or more silicates (e.g., potassium silicate, sodium silicate, etc.). In one non-limiting formulation, the binder includes a combination of potassium silicate and sodium silicate in a weight ratio of about 0.1-10:1, typically about 0.5-2:1, and more typically about 1:1. In another and/or alternative non-limiting formulation of the binder, the one or more binders can include a micro emulsion of silicon dioxide. The silicon dioxide can be in a pure and/or unpure form. Examples of unpure forms of silicon dioxide include, but are not limited to, quartz, feldspar, mica, biotite, olivine, hornblende, muscovite, pyroxenes, and/or other sources of silicon dioxide. In yet another and/or alternative non-limiting embodiment of the invention, the end coating material includes a liquid component prior to the end coating material being dried. The liquid component is liquid that is not associated with the one or more binders. The liquid component is generally used to disperse the components of the end coating material in solution so that the end coating material can be applied to the electrode. Generally, the liquid component primarily includes water; however, additional and/or alternative liquids can be used. The liquid facilitates in suspending the particles of the end coating material and/or facilitates in the application of the end coating material on the electrode. In one aspect of this non-limiting embodiment, the liquid component constitutes about 0.1-80 weight percent of the end coating material prior to being dried, typically about 5-70 weight percent of the end coating material prior to being dried, more typically about 20-65 weight percent of the end coating material prior to being dried, still more typically about 30-60 weight percent of the end coating material prior to being dried, and even more about 40-55 weight percent of the end coating material prior to being dried; however, other weight percentages can be used.

In a further and/or alternative aspect of the present invention, the end coating material can include a thickening agent to facilitate in the suspension of one or more components of the end coating composition. The thickening agent can include a variety of compounds such as, but not limited to, starches (e.g., arrowroot, cornstarch, etc.), fecula, gelatins (e.g., agar-agar, etc.), rosin, clays, silicas, cellulose thickeners (e.g., sodium carboxymethyl cellulose, methyl cellulose, hydroxyethyl cellulose, microcrystalline cellulose, etc.), gums (cellulose gums, xanthan gums, guar gum, gum arabic, etc.), gelatin, hydrocolloids, alginates, carrageenan, pectin, etc. In one non-limiting embodiment, the thickening agent, when used, includes CMC. The content of the one or more thickening agents, when used, in the end coating material is generally about 0.05-20 weight percent of the end coating material prior to being dried, typically about 0.5-10 weight percent of the end coating material prior to being dried, and more typically about 1-5 weight percent of the end coating material prior to being dried; however, other weight percentages can be used.

In yet a further and/or alternative aspect of the present invention, the end coating material can include a moisture pick-up resisting agent that reduces the rate of moisture pick-up by the end coating material. High levels of moisture in the end coating material can introduce hydrogen into the weld metal which can result in hydrogen cracking of the weld metal and/or porosity problems in the weld metal. In one non-limiting embodiment, the end coating composition includes a lithium compound (e.g., lithium hydroxide, etc.). The content of the one or more moisture pick-up resisting agents, when used, in the end coating material is generally about 0.01-10 weight percent of the end coating material prior to being dried, typically about 0.05-5 weight percent of the end coating material prior to being dried, and more typically about 0.1-2 weight percent of the end coating material prior to being dried; however, other weight percentages can be used.

In still yet a further and/or alternative aspect of the present invention, the end coating material can include one or more compounds that at least partially shields the weld metal at the beginning of a welding process. The mechanism for such shielding can include, but is not limited to, at least partially increasing the surface tension of the metal droplets being formed and/or transferred to the workpiece, and/or at least partially forming a shielding environment about the metal droplets being formed and/or transferred to the workpiece. The mechanism for increasing the surface tension includes, but is not limited to, the formation of larger sized droplet formation, molten metal on the end of the electrode which are transferred to the workpiece. These larger droplets reduce the amount of oxygen and/or nitrogen that can mix with the molten metal thereby reducing the porosity problems of the formed weld bead. The mechanism for forming a shielding environment includes, but is not limited to, 1) the at least partial coating of the formed droplet of molten metal with a material that inhibits or prevents oxygen and/or nitrogen from penetrating into the droplet and/or into the molten metal on the workpiece, and/or 2) the release of a shielding gas about the formed droplet and/or deposited weld metal. In one non-limiting embodiment, the end coating composition includes a fluoride compound. One non-limiting fluoride compound includes, but is not limited to $Na_3AlF_6$. One source of $Na_3AlF_6$ includes cryolite. In still another and/or alternative aspect of this non-limiting embodiment, the one or more compounds that at least partially shield the weld metal, when used, generally constitutes about 0.05-60 weight percent of the end coating material prior to being dried, typically about 1-55 weight percent of the end coating material prior to being dried, more typically about 2-50 weight percent of the end coating material prior to being dried, even more typically about 3-45 weight percent of the end coating material prior to being dried; however, other weight percentages can be used. The average size of the one or more shielding compounds is generally no greater than about 100 mesh, and typically about 150-400 mesh; however, other sizes can be used.

In another and/or alternative aspect of the present invention, the end coating material can include a coloring agent to modify the color of the end coating material. In some applications, it may be desirable to have the end coating material closely match the coating composition on the electrode. In other applications, it may be desirable to have the color of the end coating material differ from the coating composition on the electrode. The different color of the end coating material can be used to visually indicate one or more properties of the electrode such as, but not limited to, 1) the fact that the electrode includes an end coating material, 2) the integrity of the end coating material, 3) the type of end coating material, 4) the type of electrode, 5) the type of coating composition on the electrode, 6) the type of wire rod in the electrode, etc. Many different types of coloring agents can be used (e.g., carbon black, titanium dioxide, iron oxides, etc.). One coloring agent that can be used is titanium dioxide. Titanium dioxide typically adds a white pigment to the end coating material when used, thereby lightening the color of the end coating material. As can be appreciated, another and/or additional coloring agent can be used to obtain a wide variety of colors for the end coating material. In one aspect of this non-limiting embodiment, the coloring agent, when used, generally constitutes about 0.01-15 weight percent of the end coating material prior to being dried, typically about 0.05-10 weight percent of the end coating material prior to being dried, more typically about 0.1-8 weight percent of the end coating material prior to being dried, and even more typically about 0.2-5 weight percent of the end coating material prior to being dried; however, other weight percentages can be used. The average size of the one or more coloring agents is generally no greater than about 100 mesh, and typically about 150-400 mesh; however, other sizes can be used.

In still another and/or alternative aspect of the present invention, the end coating material is applied to the electrode prior to and/or after the coating composition is applied to the wire rod. In one non-limiting embodiment of the invention, the end coating material is applied to the electrode at least partially after the coating composition is applied. When the end coating material is applied to the electrode after the coating composition is at least partially applied, the end coating material is generally applied after the coating composition is at least partially dried; however, this is not required. In another and/or alternative non-limiting embodiment of the invention, the end coating material can be applied to the electrode by a variety of mechanisms such as, but not limited to, spray coating, dipping, rolling, brush coating, etc. One or more coating mechanism can be used to apply one or more coatings of the end coating material on the electrode. The end coating material is generally applied to the tip of the welding rod to substantially cover or coat the tip of the welding rod. In still another and/or alternative non-limiting embodiment of the invention, the coating thickness of the end coating material is at least about 0.0001 inch, and typically about 0.0005-0.5 inch; however, other thicknesses can be used. In still yet another and/or alternative non-limiting embodiment of the invention, the average length of the coating of the end coating material starting from the end of the electrode is generally at least about 0.01 inch, typically about 0.05-1 inch, more typically about 0.05-0.5 inch, and even more typically about 0.075-0.4; however, other lengths can be used.

In yet another and/or alternative aspect of the present invention, the end of the wire rod is treated to at least partially remove and/or bevel the tip of the welding rod. The bevel or tapered tip of the welding rod facilitates in a "hot start" of the welding arc at the beginning of a welding procedure. Due to the smaller cross-section of the welding rod in the tapered region of the welding rod tip, the current density is greater at arc initiation. The greater current density facilitates in a "hot start" to the arc and also facilitates in establishing puddle control of the weld metal, especially when welding in the vertical down position. The treatment of the tip of the welding rod can be accomplished by one or more mechanisms such as, but not limited to, sanding, grinding, cutting, etc. The region of the tip of the welding rod that is treated as measured from the tip of the welding rod is typically less than about 1.5 inches, typically about 0.1-1 inch, and more typically about 0.2-0.5 inch; however, other lengths can be used. The maximum amount the welding rod is tapered is generally at least about 10% of the maximum width or diameter of the welding rod, typically about 15-80% of the maximum width or diameter of the welding rod, and more typically about 25-60% of the maximum width of the welding rod; however other dimensions can be used. The taper on the welding rod can be uniform or can vary. Typically the taper is a substantially uniform taper. When the welding rod tip is tapered or beveled, the beveled angle is about 15-80°, and typically about 20-50°; however, other angles can be used. In one non-limiting design, the welding rod has a diameter of about 0.126-0.177 inch (3.2-4.5 mm), and the tip of the welding rod is tapered such that the tip has a diameter of about 0.0625-0.125 inch, and the taper begins at about 0.31-0.44 inch from the tip of the welding rod.

In yet another and/or alternative aspect of the present invention, the end coating material and/or coating composition on the end region of the wire rod can be applied and/or treated to at least partially form a bevel or tapered end region of the welding rod; however, this is not required. When the end coating material and/or the coating composition are treated to form a bevel or taper, such bevel or taper can be accomplished by one or more mechanisms such as, but not limited to, sanding, grinding, cutting, dissolving, etc. A portion or all of the end coating material and/or the coating composition can form the bevel end region. The angle of the taper can be uniform or non-uniform. When the end coating material and/or coating composition is tapered or beveled, the beveled angle is about 15-85°, and typically about 30-75°; however, other angles can be used. When the end coating material and/or coating composition is coated on a beveled or tapered region of the welding rod, the angle of taper of the end coating material and/or coating composition can be the same as or different from the angle of taper of the welding rod tip. In addition, when the end coating material and/or coating composition is coated on a beveled or tapered region of the welding rod, the complete tapered portion of the welding rod can be coated with the end coating material or only a portion of the tapered portion of the welding rod can be coated with the end coating material. In one non-limiting configuration, the complete tapered portion of the welding rod is coated with the coating composition and at least a portion of the coating composition is coated with the end coating material. In another non-limiting configuration, only a portion of the tapered region of the wire rod is coated with the coating composition and the end portion of the tapered region of the rod is coated with the end coating material. In this configuration, some of the end coating material can be coated over a portion of the coating composition. In this particular configuration, the end coating material generally coats about 2-85% of the outer surface of the tapered portion of the welding rod, typically about 5-50% of the outer surface of the tapered portion of the welding rod, and more typically about 5-30% of the outer surface of the tapered portion of the welding rod; however, other coverage percentages can be used. When the outer surface of the tapered portion of the welding rod is not fully covered with the end coating material, the remaining portion of the tapered portion of the welding rod is generally covered by the coating composition. In another non-limiting configuration, the coating composition is at least partially not tapered on the welding rod in the tapered region of the welding wire. The portion of the coating composition that is not tapered in the region of the taper of the welding rod tip results in a greater ratio of the amount of coating composition to amount of welding rod thereby enabling a higher concentration of arc stabilizing, gas shielding and flux components to provide stability and protection to the weld metal during the beginning of a welding process.

It is a principal object of the present invention to provide improved protection to a weld bead, especially at the beginning of a welding procedure.

Another and/or alternative object of the present invention is the provision of a consumable electrode that reduces the porosity of a weld bead, especially at the beginning of a welding procedure.

Still another and/or alternative object of the present invention is the provision of a consumable electrode that facilitates in a "hot start" of the welding arc.

Yet another and/or alternative object of the present invention is the provision of a consumable electrode that includes an end coating material at least at the end of the electrode that facilitates in forming an arc between the electrode and the work piece.

A further and/or alternative object of the present invention is the provision of a consumable electrode that includes an end coating material that is different from the coating composition of the electrode.

Still a further and/or alternative object of the present invention is the provision of a consumable electrode that includes an end coating material that has a different color than the exterior of the metal rod and/or a coating composition on the metal rod.

These and other objects and advantages will become apparent from the discussion of the distinction between the invention and the prior art and when considering the preferred embodiment as shown in the accompanying drawings.

BRIEF DESCRIPTION OF THE INVENTION

Figure 1:
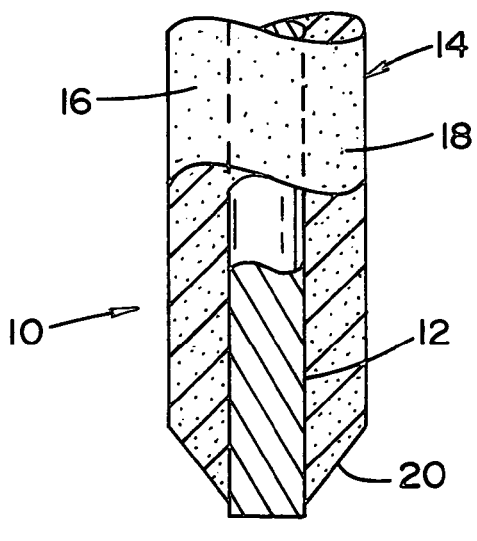
FIG. 1 is an enlarged sectional view of the end portion of a prior art stick electrode having a flux coating on a metal rod.

Referring now in greater detail to the drawings, wherein the showings are for the purpose of illustrating preferred embodiments of the invention only, and not for the purpose of limiting the invention, FIG. 1 illustrates a lower sectional portion of a prior art stick electrode 10. The stick electrode includes a solid metal rod 12 and a flux coating 14 coated on the exterior surface of the metal rod. The flux coating generally includes a binder that secures a flux agent 16 and/or metal alloying agent 18 to the metal rod. The components of the flux agent typically include metal oxides (e.g., aluminum oxide, boron oxide, calcium oxide, chromium oxide, iron oxide, magnesium oxide, niobium oxide, potassium oxide, silicon dioxide, sodium oxide, tin oxide, titanium oxide, vanadium oxide, zirconium oxide, etc.), metal carbonates (e.g., calcium carbonate, etc.), and/or metal fluorides(e.g., barium fluoride, bismuth fluoride, calcium fluoride, potassium fluoride, sodium fluoride, Teflon, etc.). The metal alloying agents can include a variety of metals (e.g, aluminum, boron, calcium, carbon, iron, manganese, nickel, silicon, titanium, zirconium, etc.). The particular components of the flux coating and/or metal alloying agents generally depend on the type of welding process to be used and/or the type of workpiece to be welded and the composition of the weld bead to be formed. The end of region of the stick electrode is shown to be tapered 20; however, this is not required.

Figure 2:
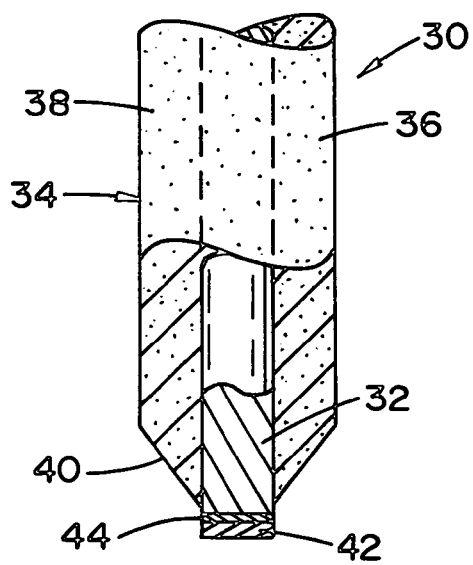
FIG. 2 is an enlarged sectional view of the end portion of another prior art stick electrode having a flux coating on a metal rod and a graphite plug attached to the end of the metal rod.

Referring now to FIG. 2, a lower sectional portion of another prior art stick electrode 30 is illustrated. The stick electrode includes a solid metal rod 32 and a flux coating 34 coated on the exterior surface of the metal rod. The flux coating generally includes a binder that secures a flux agent 36 and/or metal alloying agent 38 to the metal rod. The end of region of the stick electrode is shown to be tapered 40; however, this is not required. A graphite plug 42 is secured to the end of the stick electrode by a binder 44. The graphite plug was typically used to assist in starting the arc between the end of the stick electrode and the workpiece.

Figure 3:
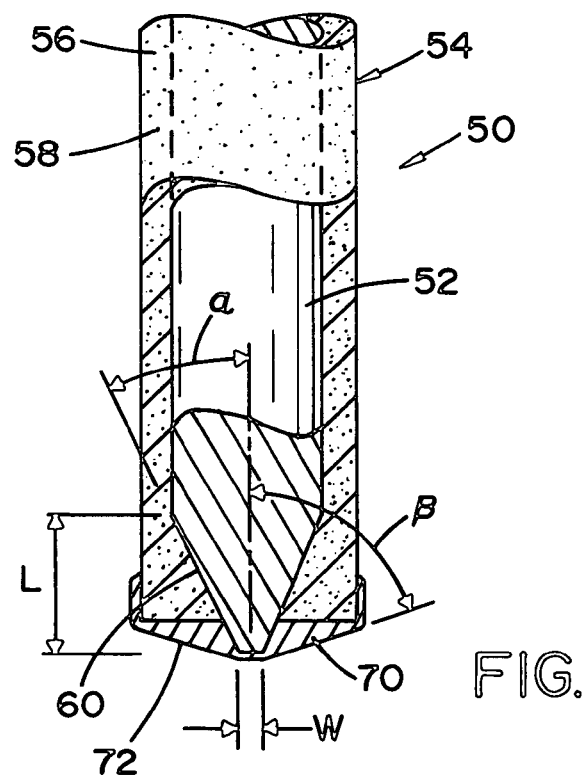
FIG. 3 is an enlarged sectional view of the end portion of a stick electrode in accordance with the present invention.

Referring now to FIG. 3, there is illustrated a stick electrode 50 in accordance with the present invention. The stick electrode 50 includes a metal rod 52 which may be a solid metal rod or a cored metal rod. The metal rod typically is a 3.2 mm, 4 mm or 4.5 mm diameter rod; however, other sized rods can be used. The exterior surface of the metal rod is a coated with a coating material 54. The coating material includes a binder to secure a flux agent 56 and one or more metal alloying agents 58 to the metal rod. The average thickness of the coating material on the metal rod is typically about 0.05-0.2 inch; however, other thicknesses can be used. The end region of the metal rod is shown as being tapered 60. The taper has an angle $\alpha$ of typically about 25-45°; however, other angles can be used. The length L of the tip of the welding rod that includes the taper is typically about 0.1-1 inch, and more typically about 0.25-0.5 inch; however, other lengths can be used. The width W of the tip of the welding rod is typically about 0.01-0.25 inch, and more typically about 0.07-0.11 inch; however, other widths can be used. The ratio of the length L to the width W of the tapered end region is typically about 1.5-10:1, and more typically about 2-6.5:1; however, other ratios can be used. The tapered end of the metal rod is designed to facilitate in a "hot start" to the electric arc at the beginning of a welding process.

As shown in FIG. 3, coating material 54 coats all or a portion of the tapered end. Typically when metal rod 52 is coated with coating material 54 (e.g., extruding process, etc.), the complete tapered end 60 is coated with the coating material. After the coating material has been applied to the metal rod, the front and back end of the electrode are typically treated so as to remove some of the coating material from the electrode. As shown in FIG. 3, the front of the electrode was treated (e.g., brushing, grinding, dissolving, etc.) to remove some of the coating material and to expose a small region of the metal rod at the tip of the tapered portion of the metal rod. Typically only 1-50% of the tapered portion of the metal rod is exposed, and more typically about 5-40% of the tapered portion of the metal rod is exposed, and even more typically about 10-30% of the tapered portion of the metal rod is exposed; however, other percentages of exposure can be used. After the coating material at the front end of the electrode has been treated, an end coating material 70 is applied to the front end of the electrode. Typically the end coating material is applied to the electrode by a dipping process; however other or additional processes can be used (e.g., brushing, spraying, etc.). As illustrated in FIG. 3, the end coating material fully coats the tapered portion of the metal rod that is not coated with coating material 54; however, this is not required. The end coating material is also disclosed as having a taper of an angle β; however, this is not required. When the end coating is tapered, angle β is typically about 45-89°, and more typically about 60-85°; however, other angles can be used. The end coating material as illustrated can be partially coated on the other surface of a portion of coating material 54; however, this is not required. The end coating material can include a pigment so as to blend the color of the end coating material with the color of the coating material or to make the end coating material stand out from the coating material.

Typically, the end coating material coats only about 5-80% of taper length L, and more typically about 10-60% of tapper length L; however, other amounts can be used. As shown in FIG. 3, coating material 54 is not tapered in the region of taper 60; however, it can be appreciated that some taper of the coating material in such region can be used.

The end coating material 70 has a different composition from coating material 54. The end coating material is primarily formulated to facilitate in forming an electric arc between the end of the electrode and a workpiece during the beginning of a welding process. The coating material is primarily designed to provide arc stability, shielding gas, deoxidizing agents, slag forming agents, slag modifiers and/or alloying metals to the weld metal during the welding process. The combined effect of the end coating material, end coating material profile, coating material, coating material profile, welding rod composition, and welding rod profile is the formation of a weld metal having low porosity, and in some instances low hydrogen content.

It has been found that at the beginning of a welding process, the welding metal at the beginning of a welding process may not be provided with adequate shielding against the water, oxygen and nitrogen in the air, thereby resulting in such components becoming dissolved into the weld metal during a welding process. As the weld metal cools, the oxygen and nitrogen are re-released into the atmosphere, thereby causing porosity problems in the weld bead which can compromise the quality and/or strength of the weld bead, the moisture in the air can increase the hydrogen content of the weld metal.

End coating material 70 is formulated to facilitate in the starting of an arc so that the welding rod will properly melt and begin the formation of a weld bead at the beginning of a the welding process. The end coating material includes a binder and an electrically-conductive material. The electrically-conductive material facilitates in the conduction of current to the tip of the electrode which results in the heating and melting of the electrode during a welding procedure. The electrically-conductive material is typically graphite; however, other or additional electrically-conductive materials can be used. The average particle size of the electrically-conductive material is selected to be sufficiently small to stay in suspension until the end coating material can be applied to the welding electrode. Typically, the average particle size of the electrically-conductive material is about 100-250 mesh. The binder is used to secure the electrically-conductive material to the end of the stick electrode. The binder is typically a combination of potassium and sodium silicate; however, other or additional binders can be used. The binder may also include a compound that reduces the moisture pick-up of the end coating material. One such compound is lithium hydroxide. The end coating material can include a thickening agent which is used to facilitate in maintaining the electrically-conductive material in suspension in the end coating material. One thickener that can be used is CMC (carboxymethylcellulose); however, other or additional thickeners can be used. The end coating material may also include a gas generating compound to provide some shielding to the weld metal at the beginning of a welding procedure. One such compound is a fluoride compound; however, other or additional compounds can be used. The end coating material can also include a pigment to alter the color of the end coating material. A general formulation of the end coating material prior to drying is set forth in weight percent as follows:

| Electrically-conductive material | 5-50 |
|---|---|
| Binder | 10-60 |
| Pigment | 0-10 |
| Gas generating material | 0-50 |
| Moisture Pick-up Resisting Agent | 0-10 |
| Thickener | 0-10 |
| Water | 20-75 |

More specific examples of the end coating material prior to drying is set forth in weight percent are set forth below:

EXAMPLE 1

| Electrically-conductive material | 10-40 |
|---|---|
| Binder | 15-50 |
| Pigment | 0-8 |
| Gas generating material | 0-45 |
| Moisture Pick-up Resisting Agent | 0-5 |
| Thickener | 0-8 |
| Water | 30-60 |

EXAMPLE 2

| Electrically-conductive material | 10-30 |
|---|---|
| Binder | 20-40 |
| Pigment | 0-4 |
| Gas generating material | 0-45 |
| Moisture Pick-up Resisting Agent | 0-2 |
| Thickener | 0-5 |
| Water | 40-55 |

EXAMPLE 3

| Graphite | 10-30 |
|---|---|
| Potassium silicate | 5-30 |
| Sodium silicate | 5-30 |
| Pigment | 0-4 |
| Fluoride compound | 0-45 |
| Lithium compound | 0-2 |
| CMC | 0-5 |
| Water | 40-55 |

EXAMPLE 4

| | |
|---|---|
| Graphite | 10-30 |
| Potassium silicate | 10-25 |
| Sodium silicate | 10-25 |
| Pigment | 0-4 |
| Fluoride compound | 0-45 |
| Lithium compound | 0.1-1 |
| CMC | 0.2-5 |
| Water | 40-55 |

As illustrated in FIG. 3, the thickness of coating material 54 increases in the region of taper 60 on the welding rod. The increased thickness of coating material 54 in this region of the welding rod results in an increased amount of shielding gas production due to the increased amounts of coating material. This increased amount of shielding gas facilitates in shielding the weld metal from adverse gasses in the atmosphere so as to the reduce the porosity, and potentially, the hydrogen content of the weld metal.

The end coating material illustrated in FIG. 3 may have a similar color to the coating material, or may have a different color from the coating material. When a different coloring is used for the end coating material, such coloring can be used to identify one or more properties of the electrode (e.g. type of electrode, composition of electrode, etc.). The use of a pigment in the end coating material can be used to obtain the desired coloring of the end coating material.

The end coating material is typically applied to the stick electrode after the coating material has been applied but prior to the flux coating being fully dried; however, the end coating material can be applied after the coating material has been dried. In one specific manufacturing process, the wire rod is pre-cut and the tip of the wire rod is beveled by a grinder. The wire rod is then directed toward a coating composition and the coating composition is extruded about the outer surface of the wire rod. The coating composition on the back end of the rod is removed by a grinder to form a grip end and a portion of the coating material at the front of the wire rod is also removed. The exposed front end of the wire rod is then dipped and/or brushed with the end coating material. The end coating material can then be brushed and/or ground to form a beveled end; however, this is not required. After the end coating material is applied, the coated wire rod is dried to substantially remove all the water in the coating material and the end coating material. After the drying process, the stick electrode can be sealed in a container and/or wrapped to inhibit absorption of moisture while the stick electrode is stored.

These and other modifications of the discussed embodiments, as well as other embodiments of the invention, will be obvious and suggested to those skilled in the art from the disclosure herein, whereby it is to be distinctly understood that the foregoing descriptive matter is to be interpreted merely as illustrative of the present invention and not as a limitation thereof.

We claim:

1. A welding electrode tip comprising:
    a metal core having a cylindrical portion and a front tip region that includes a tapered metal core front tip and a front tip end,
        a taper of said tapered front metal core tip having an angle α defined by an angle between a tangential line drawn along said tapered tip and a longitudinal axis of said metal core, said angle α ranging from between about 25-45°,
        said taper having a length L as measured from said front tip end to a beginning of said cylindrical portion,
        said metal core front tip having a width W at said end of said tip,
    a coating material about an outer surface of said cylindrical portion and at least partially coated on an outer surface of said tapered metal core front tip of said metal core
        said coating material including gas generating compounds during the welding process with a workplace, and
    a tapered end coating on a remaining portion of the front tip region of the metal core and said width W of said metal core front tip,
        said end coating partially extending along an outer surface of said coating material, but less than length L,
        a taper of said tapered end coating having an angle β defined by an angle between a tangential line drawn along said tapered end coating and a longitudinal axis of said metal core, said angle β ranging from between about 45-89°,
        said end coating material including a binder and small particles of electrically-conductive material,
        said small particles have an average particle size of about 100-400 mesh,
        said end coating material formulated to facilitate in forming an electric arc between said electrode and said workpiece during the beginning of said welding process,
    said end coating material having a different composition from said coating material, a combination of said end coating material and said coating material forming a weld having lower porosity that said weld formed without using said end coating material and said coating material having said different composition.

2. The welding electrode as defined in claim 1, wherein said metal core is a solid metal rod.

3. The welding electrode as defined In claim 1, wherein said electrically-conductive material in said end coating includes graphite, metal or combinations thereof.

4. The welding electrode as defined in claim 3, wherein said end coating material includes gas generating material adapted to provide shielding during a welding procedure.

5. The welding electrode as defined in claim 4, wherein said end coating material includes a moisture pick-up resisting agent.

6. The welding electrode as defined in claim 5, wherein said moisture pick-up resisting agent includes a lithium compound.

7. The welding electrode as defined in claim 6, wherein said binder in said end coating includes at least one silicate compound.

8. The welding electrode as defined in claim 7, wherein said end coating material includes a thickener.

9. The welding electrode as defined in claim 8, wherein said thickener includes a cellulose compound.

10. The welding electrode as defined in claim 1, wherein said end coating material is a different color from said coating composition.

11. The welding electrode as defined in claim 1, wherein said end coating material has a weight percent composition prior to be dried of:

| | |
|---|---|
| electrically-conductive material | 5-50 |
| Binder | 10-60 |
| pigment | 0-10 |
| gas generating material | 0-50 |
| moisture pick-up resisting agent | 0-10 |
| thickener | 0-10 |
| water | 20-75. |

12. The welding electrode as defined in claim 11, wherein said end coating material has a weight percent composition prior to be dried of:

| | |
|---|---|
| graphite | 10-30 |
| potassium silicate | 5-30 |
| sodium silicate | 5-30 |
| pigment | 0-4 |
| fluoride compound | 0-45 |
| lithium compound | 0-2 |
| CMC compound | 0-5 |
| water | 40-55. |

13. A method for forming a weld bead having a reduced porosity comprising:
   (a) providing a welding electrode formed of a metal core having a cylindrical portion and a front tip region that includes
      a tapered metal core front tip and a front tip end,
         a taper of said tapered front metal core tip having an angle a defined by an angle between a tangential line drawn along said tapered tip and a longitudinal axis of said metal core, said angle a ranging from between about 25-45°,
         said taper having a length L as measured from said front tip end to a beginning of said cylindrical portion,
         said metal core front tip having a width W at said end of said tip,
      a coating material about an outer surface of said cylindrical portion and at least partially coated on an outer surface of said tapered metal core front tip of said metal core, and
         said coating material including gas generating compounds that provide shielding during the welding process,
         a tapered end coating on a remaining portion of the front tip region of the metal core and said width W of said metal core front tip,
         said end coating partially extending along an outer surface of said coating material, but less than length L,
         a taper of said tapered end coating having an angle β defined by an angle between a tangential line drawn along said tapered end coating and a longitudinal axis of said metal core, said angle β ranging from between about 45-89°,
         said end coating material including a binder and small particles of electrically-conductive material,
         said small particles have an average particle size of about 100-400 mesh,
         said end coating material having a different composition from said coating material, a combination of said end coating material and said coating material forming a weld having lower porosity that said weld formed without using said end coating material and said coating material having said different composition; and,
   (b) applying an electric current to said welding electrode to at least partially melt an end of said welding electrode thereby causing melted portions of said metal core to at least partially form the weld bead, at least one component of said end coating material enhancing the formation of an electric arc between said welding electrode and a workpiece.

14. The method as defined in claim 13, wherein
   said electrically-conductive material in said end coating includes graphite, metal and combinations thereof.
15. The method as defined in claim 14, wherein
   said end coating material includes gas generating material adapted to provide shielding during a welding procedure.
16. The method as defined in claim 15, wherein
   said end coating material includes a moisture pick-up resisting agent.
17. The welding electrode as defined in claim 16, wherein
   said moisture pick-up resisting agent includes a lithium compound.
18. The method as defined in claim 17, wherein
   said binder includes at least one silicate compound.
19. The method as defined in claim 18, wherein
   said end coating material includes a thickener.
20. The method as defined in claim 19, wherein
   said thickener includes a cellulose compound.
21. The method as defined in claim 13, wherein
   said end coating material is a different color from said coating composition.
22. The method as defined in claim 13, including the step of beveling said front tip of said welding electrode.
23. The method as defined in claim 13, wherein
   said end coating material has a weight percent composition prior to be dried of:

| | |
|---|---|
| electrically-conductive material | 5-50 |
| Binder | 10-60 |
| pigment | 0-10 |
| gas generating material | 0-50 |
| moisture pick-up resisting agent | 0-10 |
| thickener | 0-10 |
| water | 20-75. |

24. The method as defined in claim 23, wherein
   said end coating material having a weight percent composition prior to be dried of:

| | |
|---|---|
| graphite | 10-30 |
| potassium silicate | 5-30 |
| sodium silicate | 5-30 |
| pigment | 0-4 |
| fluoride compound | 0-45 |
| lithium compound | 0-2 |
| CMC compound | 0-5 |
| water | 40-55. |

25. A method for forming a welding electrode comprising:
   (a) providing a metal wire having a metal core cylindrical portion and a front tip region that includes a tapered front tip and a front tip end;
      a taper of said tapered front metal core tip having an angle a defined by an angle between a tangential line drawn along said tapered tip and a longitudinal axis of said metal core, said angle a ranging from between about 25-45°, said taper having a length L as measured from said front tip end to a beginning of said cylindrical portion, said metal core front tip having a width W at said end of said tip, (b) applying a coating material about an outer surface of said cylindrical portion and at least partially coated on an outer surface of said tapered metal core front tip of said metal core, said coating material comprising gas generating compounds that provide shielding during the welding process;

(c) removing said coating material from at least a portion of said beveled front tip of said welding wire;

(d) applying a tapered end coating material on a remaining portion of said front tip region of said metal core and said width W of said metal core front tip of said weld electrode, said end coating partially extending along an outer surface of said coating material, but less than length L, a taper of said tapered end coating having an angle β defined by an angle between a tangential line drawn along said tapered end coating and a longitudinal axis of said metal core, said angle β ranging from between about 45-89°, said end coating material including a binder and small particles of electrically-conductive material, said electrically-conductive material including graphite, metal and combinations thereof, said small particles have an average particle size of about 100-400 mesh, said end coating material having a different composition from said coating material, a combination of said end coating material and said coating material forming a weld having lower porosity that said weld formed without using said end coating material and said coating material having said different composition; and, (e) drying said coating material and said end coating material.

26. The method as defined in claim 25, wherein said step of applying said coating material is at least partially by an extrusion process.

27. The method as defined in claim 26, wherein said step of applying said end coating material is at least partially by a dipping process, a brushing process, a spraying process, a rolling process, or combinations thereof.

28. The method as defined in claim 27, including the step of beveling said front tip of said welding electrode.

29. The welding electrode as defined in claim 25, wherein said end coating material is a different color from said coating composition.

30. The welding electrode as defined in claim 25, wherein said end coating material only coated on said front tip region, coated about said front tip region, and combinations thereof, said end coating material coated along a longitudinal length of said metal core from said front tip to up to about 1 inch from said front tip.

31. A welding electrode comprising
a metal core having a front tip region that includes a front tip,
a coating material at least partially coated on an outer surface of said metal core
said coating material including gas generating compounds during the welding process with a workpiece, and
an end coating on said front tip and at least partially on a remaining portion of the front tip region of the metal core, said end coating only partially coated on an outer surface of said coating material, said end coating material including a binder and small particles of electrically-conductive material, said small particles have an average particle size of about 100-400 mesh, said end coating material formulated to facilitate in forming an electric arc between said electrode and said workpiece during the beginning of said welding process, said end coating material having a different composition from said coating material, a combination of said end coating material and said coating material forming a weld having lower porosity that said weld formed without using said end coating material and said coating material having said different composition, said front tip region of said metal core having a taper angle between about 25-45°, said end coating having a taper angle between about 45-89°, said end coating material coating about 5-80% of a taper length of said front tip region of said metal core.

32. The electrode of claim 31 wherein
a ratio of a width of said front tip to said length of said taper length of said front tip region of said metal core ranges from about 1.5:1 to 10:1.

33. The electrode of claim 32 wherein
said ratio ranges from about 2:1 to 6.5:1.

34. The electrode as defined in claim 33, wherein
said end coating material further comprises a moisture pick-up resisting agent.

35. The electrode as defined in claim 34, wherein
said moisture pick-up resisting agent is a lithium compound.

36. The electrode as defined in claim 31, wherein
said end coating material is a different color from said coating composition.

37. The electrode as defined in claim 31 wherein
said coating composition comprises metal oxides, metal carbonates, metal fluorides, metal alloying agents and a binder.

38. The electrode as defined in claim 37 wherein
said metal oxide are selected from the group consisting of aluminum oxide, boron oxide, calcium oxide, chromium oxide, iron oxide, magnesium oxide, niobium oxide, potassium oxide, silicon dioxide, sodium oxide, tin oxide, titanium oxide, vanadium oxide, and zirconium oxide, said metal fluoride is selected from the group consisting of barium fluoride, bismuth fluoride, calcium fluoride, potassium fluoride, sodium fluoride, and Teflon, said metal alloying agent is selected from the group consisting of aluminum, boron, calcium, carbon, chromium, iron, manganese, nickel, silicon, titanium, and zirconium, said binder further comprises silicates, and
one or more slag modifiers.

39. The electrode as defined in claim 38 wherein
said binder further comprises sodium silicate and potassium silicate.

40. The electrode as defined in claim 31 wherein
said electrically-conductive material is selected from the group consisting of graphite, titanium, iron, iron alloys and aluminum.

* * * * *